J. A. DIENNER.
REVERSING MECHANISM.
APPLICATION FILED MAR. 13, 1919.
1,409,531.
Patented Mar. 14, 1922.
2 SHEETS—SHEET 1.
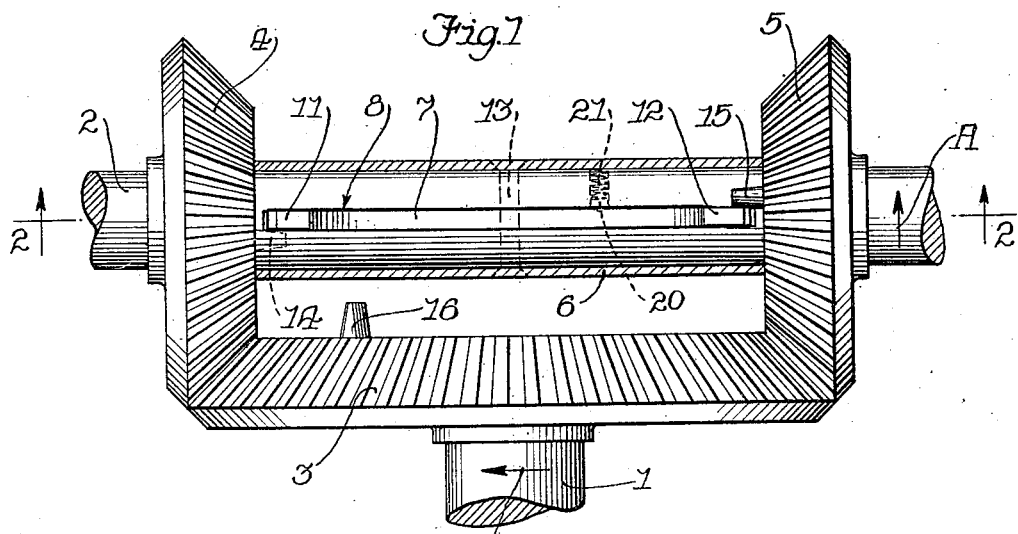
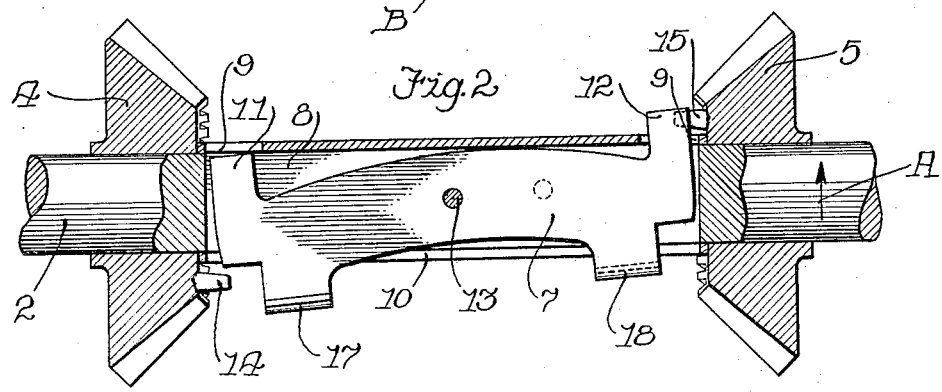
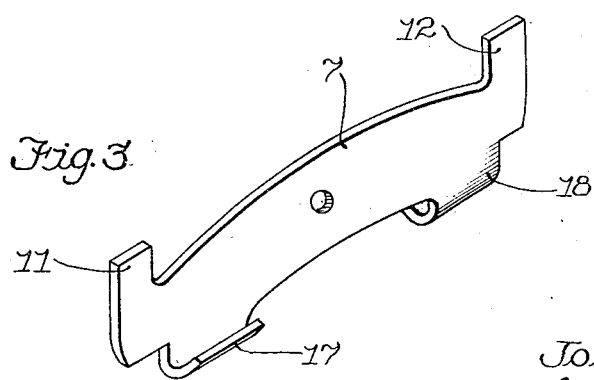
Inventor
John A. Dienner
By Brown Bartens + Dienner
Attorneys

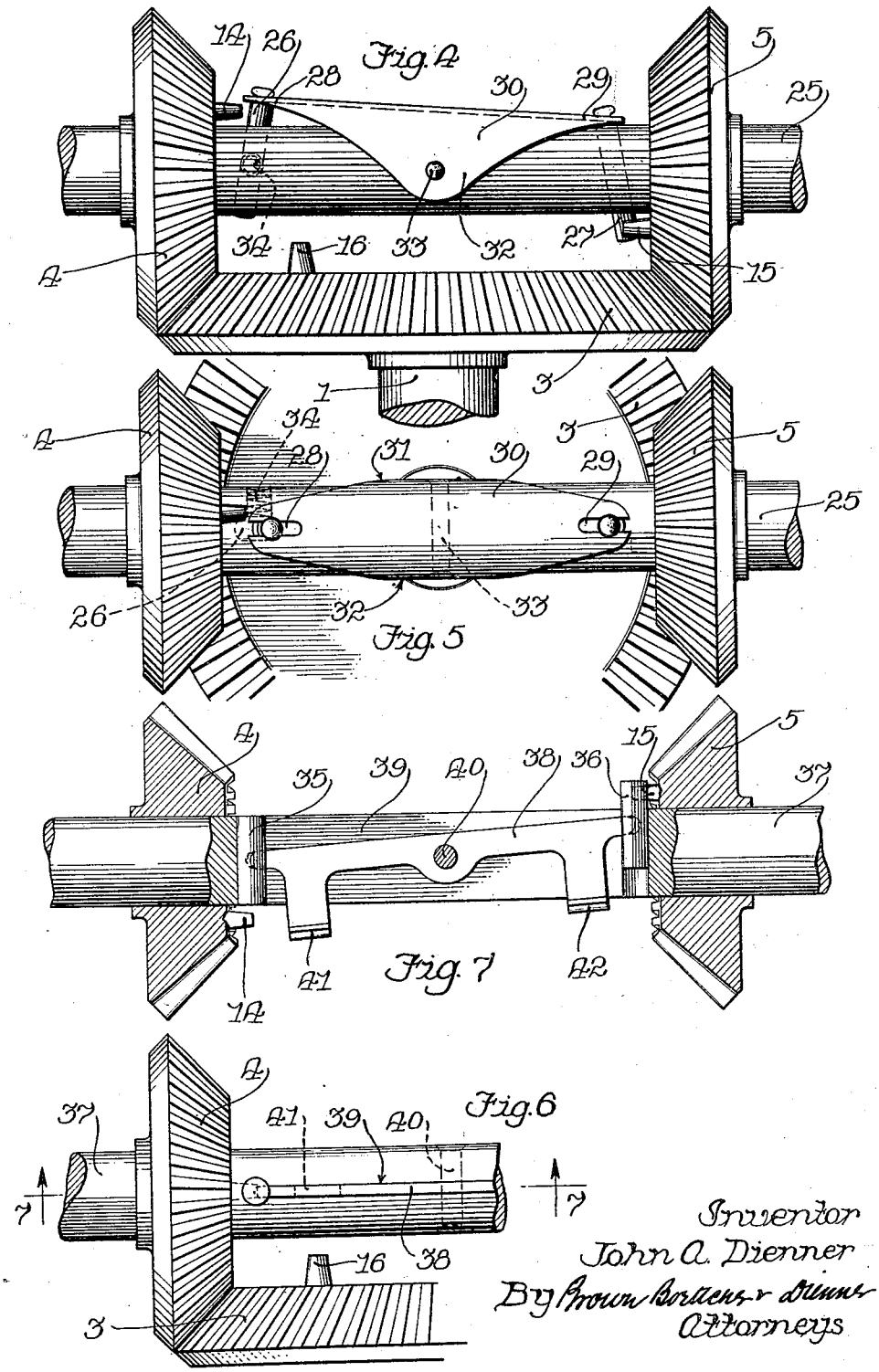

UNITED STATES PATENT OFFICE.

JOHN A. DIENNER, OF CHICAGO, ILLINOIS, ASSIGNOR TO WALTER J. CONLON, OF CHICAGO, ILLINOIS.

REVERSING MECHANISM.

1,409,531. Specification of Letters Patent. Patented Mar. 14, 1922.

Application filed March 12, 1919. Serial No. 282,370.

*To all whom it may concern:*

Be it known that I, JOHN A. DIENNER, a citizen of the United States, residing at Chicago, in the county of Cook and State of Illinois, have invented a certain new and useful Improvement in Reversing Mechanisms, of which the following is a full, clear, concise, and exact description, reference being had to the accompanying drawings, forming a part of this specification.

My invention relates to reversing mechanisms for automatically reversing the direction of rotation of a driven member at regular intervals, driven by a driving shaft operating continuously in one direction.

Reversing mechanisms of this general description are used in connection with washing machines, churns, and the like.

My improved reversing mechanism is primarily adapted for use in connection with washing machines, wherein the washing drum is rotated a number of times in one direction and then a number of times in the opposite direction, to prevent wadding of the clothes inside the drum.

I am aware that reversing mechanisms of this general description have been provided heretofore in the art and have observed that such devices have been generally of an expensive and complex construction, and many of them subject to failure to operate positively at all times.

The particular type to which my invention relates employs the power of the driving shaft to operate the clutch shifting mechanism so that positive reversal is always secured.

Devices of this general character have heretofore been known but the construction of the same has been complicate and difficult both because of the machining operations required and the cost of assembly.

My invention aims to provide a reversing mechanism of the simplest character consistent with strength and durability.

In accordance with the teachings of my invention I provide a pair of spaced bevel pinions loosely mounted upon the driving shaft and constantly in mesh with a bevel gear connected to rotate in unison with the driven member; clutching means of simple and durable construction having a swinging lever mounted in the driving shaft and provided with engaging portions guided in ways in the shaft, the lever being periodically actuated upon the rotation of this bevel gear to alternately clutch first one and then the other of the spaced bevel pinions to the driving shaft. Power is thereby alternately transmitted from the driving shaft to the driven member first through one bevel pinion and then through the other bevel pinion, rotating the bevel gear and consequently the driven member a number of times in one direction and then a number of times in the opposite direction.

In order that those skilled in the art may be fully acquainted with the nature and scope of my invention I shall describe a specific embodiment of the invention in connection with the accompanying drawings which form a part of the present specification, and wherein:

Figure 1 is a plan view of a reversing mechanism embodying my invention;

Figure 2 is a vertical sectional view taken on the line 2—2 of Figure 1;

Figure 3 is an isometric view of the clutch lever which is mounted in the driving shaft;

Figure 4 is a view similar to Figure 1 showing a modification;

Figure 5 is a front elevational view of the same;

Figure 6 is a fragmentary plan view showing a further modification; and

Figure 7 is a vertical sectional view taken on the line 7—7 of Figure 6.

Referring first to Figures 1, 2 and 3 of the drawings; I have provided for reversing the direction of rotation of the shaft 1 at regular intervals, automatically and without in any way effecting the rotation of the driving shaft 2, which driving shaft 2 is adapted for operating continuously in one direction. A bevel gear 3 is splined or otherwise suitably fixed upon the end of the shaft 1.

As will be hereinafter more fully explained, the bevel gear 3 and consequently the shaft 1, is driven for a definite number of revolutions in one direction and then a definite number of revolutions in the opposite direction. In machines wherein it is desirable that the direction of rotation of a driven member be periodically reversed, such as for example, in washing machines, in connection with which my invention is primarily adapted, the washing drum is positioned on or otherwise connected to rotate in unison with the driven shaft 1.

The driving shaft 2, which is adapted to be driven continuously in one direction as by means of a suitable motor, bears two loosely mounted bevel pinions 4 and 5, which bevel pinions mesh with the bevel gear 3 at all times. A spacing sleeve 6 is provided on the driving shaft 2 between the bevel pinions 4 and 5 for maintaining the proper spaced relation of these pinions. The spacing sleeve 6 is immaterial in so far as my invention is concerned, and might be readily dispensed with by the provision of any other suitable means for holding the bevel pinions 4 and 5 in place, such as suitable pins fixed in the shaft 2 and projecting radially therefrom adjacent the faces of the bevel pinions 4 and 5. These bevel pinions 4 and 5, which are loosely mounted upon the driving shaft 2, are adapted to be alternately clutched thereto; power being thereby transmitted intermittently from the driving shaft 2 to the shaft 1 through one and then through the other of these pinions.

This alternate clutching of the pinions 4 and 5 to the driving shaft 2 is accomplished by means of a clutch lever 7 which clutch lever 7 is pivotally mounted in an axial slot 8 provided through the driving shaft 2 intermediate the spaced pinions 4 and 5. In the event that a spacing sleeve 6 is employed, this sleeve is provided with diametrically opposite longitudinal slots 9—9 and 10, which slots register with the axial slot 8 provided through the driving shaft 2 in order that the lugs 11 and 12 extending radially from the opposite ends respectively of the clutch lever 7 may be alternately projected from the shaft 2. The clutch lever 7 is pivotally mounted in the driving shaft 2 upon a transverse pin 13. The transverse pin 13 extends diametrically through the spacing sleeve 6, driving shaft 2 and clutch lever 7, its opposite ends being preferably headed, as shown in dotted lines in Figure 1 to prevent displacement thereof. This pin 13 not only forms a fulcrum about which the clutch lever 7 is adapted to be swung as will be hereinafter described, but in the event that a spacing sleeve 6 is employed, serves to effectively align such sleeve upon the shaft 2, preventing relative axial or circumferential movement of the sleeve 6 with respect to the shaft 2.

The lugs 11 and 12, which extend radially from the opposite ends of the clutch lever 7 are adapted to engage pins 14 and 15 respectively, carried upon the inner opposed faces of the bevel pinions 4 and 5 respectively. The pins 14 and 15 are preferably formed integral with the inner opposed faces of the pinions 4 and 5 and project inwardly therefrom so as to be in the path of rotation of the particular lug 11 or 12 projecting radially from the driving shaft 2. Obviously, as shown in Figure 2, due to the pivotal mounting of the clutch lever 7, only one of the lugs 11 or 12 will project from the shaft 2 in position to engage its co-operating pin 14 or 15 at a time.

In Figures 1 and 2 the lug 12 extending from the clutch lever 7, is shown projecting radially from the shaft 2, being in contact with the pin 15 carried by the bevel pinion 5. Assuming that the direction of rotation of the driving shaft 2 is as indicated by the arrow A, this engagement of the lug 12 with the pin 15 in effect clutches or splines the bevel pinion 5 to the driving shaft 2, the bevel pinion 5 being thereby rotated unitarily with the shaft 2. Power is thus transmitted from the driving shaft 2 to the driven shaft 1,—through the bevel pinion 5 and the bevel gear 3,—driving the shaft 1 in the direction of rotation indicated by the arrow B. The bevel pinion 4 revolves idly in mesh with the bevel gear 3 at this time.

After the driven shaft 1 has been revolved a predetermined number of times in the direction indicated by the arrow B, the clutch lever 7 is automatically swung about its pivot 13, causing the lug 12 to disengage the pin 15 and the lug 11 to be projected from the shaft 2 into position to engage the pin 14 during rotation of the shaft 2. Power will thereupon be transmitted from the driving shaft 2 to the driven shaft 1 through the bevel pinion 4 and the bevel gear 3, the direction of rotation of the shaft 1 being opposite to that indicated by the arrow B. The bevel pinion 5 revolves idly in mesh with the bevel gear 3 at this time.

The swinging of the clutch lever 7 about its pivot 13 is accomplished automatically by means of a shifter post 16 projecting inwardly from the bevel gear 3. Assuming that power is being transmitted from the shaft 2 to the shaft 1 by way of the bevel pinion 5, the direction of rotation of the shifter post 16 about the axis of the shaft 1 will be as indicated by the arrow B. After a predetermined number of revolutions of the shaft 1 in this direction, the shifter post 16 is adapted to engage a lug 17 which lug 17 is carried by the clutch lever 7 and arranged to rotate in the path of rotation of the shifter post 16. The clutch lever 7 will thereupon be swung about its pivot 13 and the shaft 1 will thereafter be driven through the bevel pinion 4 for a predetermined number of revolutions, whereupon the shifter post 16 will engage the lug 18 carried by the opposite end of the clutch lever 7, causing the lug 11 to disengage the pin 14 and the lug 12 to be projected from the shaft 2 into position to engage the pin 15 during rotation of the shaft 2.

The engagement of the shifter post 16 with either of the lugs 17 or 18 begins below or above the horizontal axis of the shaft 1; that is, the contact begins above or below this axis and terminates substantially at the axis.

To maintain the clutch lever 7 positively in each position and to prevent shifting of this lever except by the action of the shifter post 16, a ball plunger 20 is arranged in a bore extending radially through the driving shaft 2 from one side of the shaft to the axial slot 8. A spring 21 is arranged in this radial bore between the sleeve 6 and the ball plunger 20, this spring normally forcing the plunger 20 against the clutch lever 7. A pair of recessed or countersunk portions are provided in the clutch lever 7 for receiving the ball plunger 20; the ball plunger 20 cooperating with one recess or countersunk portion during one position of the clutch lever 7, and with the other recess or countersunk portion during the other position of the clutch lever 7. The sleeve 6 is obviously not necessary to maintain the spring 21 in the radial bore provided in the shaft 2, as a small plug or cap or the like would do equally as well.

In the modification shown in Figures 4 and 5 the bevel pinions 4 and 5 are adapted to be clutched to the driving shaft 25 by the co-operation of clutch pins 26 and 27 with the pins 14 and 15 respectively projecting inwardly from the opposed faces of the pinions 4 and 5. The clutch pins 26 and 27 are arranged in suitable diametrical bores provided in the driving shaft 5 adjacent the inner faces of the bevel pinions 4 and 5, a spacing sleeve or any other suitable means being employed for holding the bevel pinions 4 and 5 in place. An annular groove is provided adjacent one end of each of the clutch pins 26 and 27, the reduced neck portions provided by these annular grooves engaging in the slotted ends 28 and 29 respectively, of a pivoted yoke member 30. The diametrical bores provided in the driving shaft 25 for the clutch pins 26 and 27 are not strictly diametrical, but extend through the shaft at a slight angle as shown in Figure 4 in order that when either of the pins 26 or 27 is projected into the position of the pin 27 (Figure 4) either the pin 14 or the pin 15 will be engaged thereby and the bevel pinion carrying such pin will be clutched to the shaft 25. Movement of the pin 26 or the pin 27 as the case may be, into the position of the pin 26 by moving the pin through the shaft 25 at a slight angle, causes the end of the pin connected with the yoke member 30 to clear the pins 14 or 15 during rotation of the driving shaft 2.

The yoke member 30 is provided with a pair of parallel extending portions 31 and 32, which embrace the driving shaft 25. A transverse pin 33 extends diametrically through the parallel extending portions 31 and 32 of the yoke member 30 and through the driving shaft 25, thereby pivotally mounting the yoke member 30 upon the driving shaft 25.

The swinging of the yoke member 30 about its pivot 33 is accomplished automatically by means of the shifter post 16 projecting inwardly from the beveled gear 3 substantially as described in connection with Figures 1, 2 and 3. Obviously, due to the pivotal mounting of the yoke member 30, only one of the clutch pins 26 or 27 will project from the shaft 25 into position to engage its cooperating pin 14 or 15 at a time. A spring 34, arranged in the driving shaft 25, normally engages the clutch pin 26 to maintain the pin 26 and consequently the pin 27, through the yoke member 30, positively in each position, preventing shifting of the yoke member 30 except by the action of the shifter post 16. It will now be apparent that in this embodiment the clutch pins 26 and 27 form the driving connection between the driving shaft 25 and the bevel pinions 4 and 5. These short sturdy clutch pins are well able to withstand any strain connected with such operation, the yoke member 30 being merely periodically actuated by the shifter post 16 to shift the clutch pins 26 and 27 into and out of operative position.

The modification shown in Figures 6 and 7 is similar to that just described in that the clutch pins 35 and 36 form the driving connection between the driving shaft 37 and the bevel pinions 4 and 5. In this embodiment of my invention the clutch pins 35 and 36 are arranged in bores extending diametrically through the shaft 37, adjacent the inner faces of the bevel pins 4 and 5 respectively. The clutch pins 35 and 36 which are of such a length as to be disposed completely within the diameter of the driving shaft 27 when in the inoperative position are shifted into and out of operative position by means of a lever 38. The lever 38 is pivotally mounted in an axial slot 39—extending through the shaft 37 from the clutch pin 35, to the clutch pin 36—upon a transverse pin 40. Lugs 41 and 42, extending radially from the opposite ends of the lever 38 are adapted to co-operate with the shifter post 16 carried by the bevel gear 3 to swing the lever 38 about its pivot 40, substantially as has been described in connection with Figures 1, 2 and 3.

It will now be apparent that I have provided a reversing mechanism of simple, inexpensive and substantial construction and this, together with the positiveness of operation secured thereby, are highly important aspects of my invention. The particular arrangement of the gears could be reversed if so desired, that is the fixed bevel gear could be provided upon the driving shaft, the bevel pinions meshing therewith in such event being loosely mounted upon the driven shaft.

While I have described my invention in connection with the details of particular embodiments I do not intend thereby to limit the invention to such details as I am aware and contemplate that modifications and changes may be made without departing from the invention which is set out in the appended claims:

I claim—

1. In combination, a pair of shafts, a bevel gear fixed upon one of said shafts, a pair of beveled pinions meshing with said bevel gear and loosely mounted upon the other of said shafts, said shaft having an axial slot therein intermediate said beveled pinions, a pivoted member in said axial slot, movable clutch members having connection with said pivoted member, and a shifting member carried by said fixed beveled gear, said shifting member being adapted to periodically co-operate with said pivoted member to clutch first one and then the other of said beveled pinions to the shaft upon which said pinions are normally loosely mounted.

2. In combination, a pair of shafts, a bevel gear fixed upon one of said shafts, a pair of beveled pinions meshing with said bevel gear and loosely mounted upon the other of said shafts, said shaft having an axial slot therein intermediate said beveled pinions, a pivoted member in said axial slot, a shifting member carried by said fixed bevel gear, said pivoted member having means adapted to be projected radially from said shaft to alternately clutch said beveled pinions to said shaft, and having means adapted to be projected radially from the opposite side of said shaft to co-operate with said shifting member to swing said pivoted member about its pivot.

3. In combination, a shaft, a bevel gear thereon, a pair of beveled pinions in mesh with said gear, a shaft upon which said beveled pinions are mounted, pivoted driving means disposed longitudinally of said latter shaft and driven thereby, said driving means comprising clutch means for clutching either of said beveled pinions thereto, and comprising shifter means circumferentially spaced from said clutch means relative to said latter shaft, and means carried by said bevel gear for periodically engaging said shifter means.

4. In combination, a driving shaft, a driven shaft, a pair of beveled pinions loosely mounted on said driving shaft, a bevel gear meshing with said beveled pinions and fixed on said driven shaft, said driving shaft having an axial slot therein intermediate said bevel pinions, an oscillating clutch member pivoted directly in the axial slot in said driving shaft, said clutch member comprising shifter means projecting outwardly from said slot, and comprising means for effecting clutching engagement alternately with one and then the other of said beveled pinions and means carried by said bevel gear for periodically engaging said shifter means.

5. In combination, a pair of shafts, a bevel gear fixed upon one of said shafts, a pair of beveled pinions meshing with said bevel gear and loosely mounted upon the other of said shafts, clutch pins mounted in said shaft for clutching either of said beveled pinions thereto, a pivoted member for shifting said clutch pins into and out of operative position, and means carried by said fixed bevel gear for periodically co-operating with said pivoted member for swinging said member about its pivot to shift said clutch pins alternately into and out of operative position.

6. In a reversing mechanism, in combination, a drive shaft, two driving members on said shaft, a driven mechanism operatively connected to each of said driving members for actuation thereby in opposite directions, clutch means including a single lever lying lengthwise of said drive shaft and pivotally supported thereby for rotation about an axis passing therethrough, a transverse pivot pin positioned in said shaft and passing through said lever, said clutch means operating upon movement of said lever in one direction to clutch one drive member to the shaft and upon movement in the other direction to clutch the other drive member to the shaft, and means carried by said driven mechanism for intermittently engaging said clutch means to actuate said lever alternately in opposite directions and reverse the direction of motion of said driven mechanism.

7. In a reversing mechanism, in combination, a drive shaft, two driving members on said shaft, a driven mechanism operatively connected to each of said driving members for actuation thereby in opposite directions, a slot in said shaft between said driving members, a transverse pintle extending across said slot, clutch means including a lever pivoted on said pintle, said pintle holding the lever against motion of translation, and means carried by said driven mechanism for intermittently engaging said clutch means to actuate said lever alternately in opposite directions and reverse the direction of motion of said mechanism.

8. In a reversing mechanism, in combination, a drive shaft, two driving members on said shaft, a driven mechanism operatively connected to each of said driving members for actuation thereby in opposite directions, said driving shaft having a slot adjacent said driving members, a transverse pintle extending across said slot, clutch means including a lever pivoted on said pintle, said pintle passing through said lever, said clutch means operating upon movement of said lever in one direction to clutch one drive member to the shaft and upon movement in the other direction to clutch the other drive member to the shaft, and means carried by said driven mechanism for intermittently engaging said clutch means to actuate said lever alternately in opposite directions and reverse the direction of motion of said driven mechanism, said clutch means and the means carried by the driven mechanism for engaging the same being each in operative position to engage the other means only during a predetermined portion of its path of movement, one of said means completing its path of movement a fixed number of times, while the other means completes a single path, whereby one of said means will pass through operative position one or more times without encountering the other before both means come into operative position simultaneously.

In witness whereof I hereunto subscribe my name this 10th day of March, A. D. 1919.

JOHN A. DIENNER.